US010259586B2

(12) United States Patent
McIntosh

(10) Patent No.: US 10,259,586 B2
(45) Date of Patent: Apr. 16, 2019

(54) DEPLOYABLE SEAT ASSEMBLY, SYSTEM, AND METHOD FOR AN INTERIOR CABIN OF A VEHICLE

(71) Applicant: The Boeing Company, Chicago, IL (US)

(72) Inventor: Darren Carl McIntosh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 347 days.

(21) Appl. No.: 15/144,867

(22) Filed: May 3, 2016

(65) Prior Publication Data
US 2017/0320581 A1    Nov. 9, 2017

(51) Int. Cl.
*B64D 11/06*    (2006.01)

(52) U.S. Cl.
CPC ...... *B64D 11/0697* (2014.12); *B64D 11/0691* (2014.12)

(58) Field of Classification Search
CPC .... B64D 25/04; B64D 11/02; B64D 11/0601; B64D 11/0697; B60N 2/4242; B60N 2/24; B60N 2/3027; B60N 2/3047; B60N 2/04; B60N 2/0735; B60N 2/10; B60N 2/68; B60N 2/3075
See application file for complete search history.

(56) References Cited

U.S. PATENT DOCUMENTS

| | | | | | |
|---|---|---|---|---|---|
| 2,168,094 | A | * | 8/1939 | Cozzitorto | B64D 25/04 244/141 |
| 2,606,727 | A | * | 8/1952 | De Haven | B64D 25/04 182/3 |
| 3,594,037 | A | * | 7/1971 | Sherman | A47C 1/036 297/14 |
| 4,740,030 | A | * | 4/1988 | Nordskog | A47C 9/06 16/289 |
| 4,783,025 | A | * | 11/1988 | Moffett | A61G 3/00 244/118.5 |
| 4,799,632 | A | * | 1/1989 | Baymak | B64D 11/0691 244/122 R |
| 4,832,404 | A | * | 5/1989 | Baymak | B64D 11/0691 280/808 |
| 4,993,666 | A | * | 2/1991 | Baymak | B09B 1/00 244/122 R |
| 5,133,587 | A | * | 7/1992 | Hadden, Jr. | B60N 2/4214 297/146 |
| 5,335,963 | A | * | 8/1994 | Muller | B60N 2/3047 297/14 |
| 5,383,629 | A | * | 1/1995 | Morgan | B64D 11/00 244/118.6 |

(Continued)

FOREIGN PATENT DOCUMENTS

JP     2009107372    *  5/2009

*Primary Examiner* — Medhat Badawi
(74) *Attorney, Agent, or Firm* — Joseph M. Butscher; The Small Patent Law Group, LLC

(57) ABSTRACT

A vehicle includes an interior cabin including a floor and a ceiling. A deployable seat assembly is moveably coupled to the ceiling. The deployable seat assembly is moveable between a stowed position in which at least a portion of the deployable seat assembly is stowed within a stowage space within the ceiling, and a deployed position in which the deployable seat assembly extends between the ceiling and the floor.

20 Claims, 7 Drawing Sheets

(56) References Cited

U.S. PATENT DOCUMENTS

| | | | | |
|---|---|---|---|---|
| 6,000,659 A * | 12/1999 | Brauer | B64D 11/00 | 244/118.5 |
| 6,073,986 A * | 6/2000 | Neale | B60N 2/3015 | 296/63 |
| 6,152,401 A * | 11/2000 | Green | B60N 2/24 | 244/118.6 |
| 6,224,132 B1 * | 5/2001 | Neale | B60N 2/3015 | 296/65.01 |
| 6,302,358 B1 * | 10/2001 | Emsters | B64C 1/20 | 244/137.1 |
| 6,631,946 B1 * | 10/2003 | Neale | B60N 2/3011 | 297/15 |
| 6,846,044 B2 * | 1/2005 | Moffa | B60N 2/3043 | 297/14 |
| 7,083,146 B2 * | 8/2006 | Hiesener | B64D 11/00 | 244/118.5 |
| 8,152,101 B2 * | 4/2012 | Law | B64D 11/06 | 244/118.5 |
| 8,215,695 B2 * | 7/2012 | Ida | B60N 2/01583 | 296/65.03 |
| 8,506,222 B2 * | 8/2013 | Reid | B23P 9/025 | 411/108 |
| 8,616,604 B2 * | 12/2013 | Bourgraf | B60N 2/995 | 296/19 |
| 8,691,037 B2 * | 4/2014 | Ingram, Jr. | B29C 53/587 | 156/189 |
| 8,746,315 B2 * | 6/2014 | Barlag | B29C 70/541 | 156/560 |
| 8,770,659 B2 * | 7/2014 | Isherwood | B64D 11/0691 | 297/14 |
| 8,820,862 B1 * | 9/2014 | Erickson | B64D 11/0691 | 312/257.1 |
| 9,308,999 B2 * | 4/2016 | Joffre | B64D 25/04 | |
| 9,849,045 B2 * | 12/2017 | Bourgraf | A61G 3/0218 | |
| 2004/0016847 A1 * | 1/2004 | Ritts | B64D 11/003 | 244/118.5 |
| 2004/0232283 A1 * | 11/2004 | Ferry | B60N 2/206 | 244/118.6 |
| 2009/0206200 A1 * | 8/2009 | Bolder | B64D 25/16 | 244/118.5 |
| 2013/0126672 A1 * | 5/2013 | Weitzel | B64D 11/06 | 244/118.6 |
| 2013/0206906 A1 * | 8/2013 | Burrows | B64D 11/02 | 244/118.5 |
| 2013/0206907 A1 * | 8/2013 | Burrows | B64D 11/02 | 244/118.5 |
| 2013/0313365 A1 * | 11/2013 | Ehlers | B64D 11/06 | 244/118.6 |
| 2014/0008492 A1 * | 1/2014 | Ehlers | B64D 11/00 | 244/118.5 |
| 2014/0027572 A1 * | 1/2014 | Ehlers | B64D 11/06 | 244/118.6 |
| 2014/0166808 A1 * | 6/2014 | Boenning | B64D 11/06 | 244/118.6 |
| 2014/0232153 A1 * | 8/2014 | Bell | B29C 70/545 | 297/232 |
| 2014/0312173 A1 * | 10/2014 | Ehlers | B64D 11/06 | 244/118.6 |
| 2014/0321947 A1 * | 10/2014 | Speller | B64C 1/403 | 411/511 |
| 2014/0333100 A1 * | 11/2014 | Wilkens | B64D 11/0644 | 297/163 |
| 2015/0054323 A1 * | 2/2015 | Mastrolia | B64D 25/10 | 297/313 |
| 2015/0097399 A1 * | 4/2015 | Vue | B60N 2/3045 | 297/180.1 |
| 2015/0251762 A1 * | 9/2015 | Ehlers | B64D 11/06 | 244/118.6 |
| 2017/0267350 A1 * | 9/2017 | Heidtmann | B64D 11/00 | |
| 2017/0320581 A1 * | 11/2017 | McIntosh | B64D 11/0697 | |
| 2018/0037141 A1 * | 2/2018 | Huang | B60N 2/24 | |

* cited by examiner

DEPLOYABLE SEAT ASSEMBLY, SYSTEM, AND METHOD FOR AN INTERIOR CABIN OF A VEHICLE

FIELD OF THE DISCLOSURE

Embodiments of the present disclosure generally relate to deployable seat assemblies, systems, and methods that are configured for use within interior cabins of vehicles.

BACKGROUND OF THE DISCLOSURE

Commercial aircraft typically include numerous rows of seats securely fixed in position within an interior cabin. A first class section, a business class section, and an economy class section may be within the interior cabin. Each section of the aircraft may have rows of seats spaced apart from one another.

Flight attendants attend to passengers within the interior cabin of the aircraft. Dedicated attendant seats are typically positioned within the interior cabin. For example, an attendant seat may be mounted to a monument within the interior cabin. A flight attendant sits on an attendant seat during certain operational phases of the aircraft, such as taxiing, takeoff, and landing.

As can be appreciated, aircraft operators seek to increase passenger seating capacity within a limited cabin space. As passenger seating capacity increases, revenue increases. However, attendant seats often occupy a significant area in an interior cabin of a typical aircraft. Accordingly, the space occupied by an attendant seat is space that is unable to be used for passenger seating.

Moreover, locations for attendant seats are often restricted to particular areas in order to comply with various safety considerations such as emergency egress paths, attendant assist space, and attendant viewpoints into the main cabin. Further, because known attendant seats are typically secured to monuments (such as a portion of a lavatory, galley, partition, and/or the like), the monuments are initially dynamically tested before being secured within the interior cabin. The testing and certification process for the monuments is often expensive. Further, in order to safely accommodate attendant seats, the monuments include various structural features that are configured to secure to the attendant seats, thereby adding weight and complexity to the monuments.

SUMMARY OF THE DISCLOSURE

A need exists for a system and method of providing attendant seats within an aircraft that allow for increased passenger seating capacity. A need exists for an attendant seat assembly that allows for increased passenger seating capacity within an interior cabin of a vehicle. A need exists for an attendant seat assembly that is efficiently located within an interior cabin of an aircraft. A need exists for an attendant seat assembly that may not be secured to a monument within an interior cabin of a vehicle.

With those needs in mind, certain embodiments of the present disclosure provide a vehicle that includes an interior cabin including a floor and a ceiling. A deployable seat assembly is moveably coupled to the ceiling. The deployable seat assembly is moveable between a stowed position in which at least a portion of the deployable seat assembly is stowed within a stowage space within the ceiling, and a deployed position in which the deployable seat assembly extends between the ceiling and the floor.

The interior cabin may include an aisle extending between sections of passenger seats. In at least one embodiment, the deployable seat assembly is stowed above a portion of the aisle in the stowed position, and connects to a floor portion of the aisle in the deployed position.

The interior cabin may include a lavatory. In at least one embodiment, at least a portion of the deployable seat assembly may be positioned over a an entry into and/or a portion of the lavatory in the stowed position, and extend into the entry in the deployed position. The portion of the lavatory may be or include a threshold of the lavatory.

The deployable seat assembly may include a carrier frame that supports a seat having a backrest and a seat bottom. The carrier frame may provide a ceiling portion when the deployable seat assembly is in the stowed position. The seat bottom may be moveable between a seat stowed position and an extended supporting position. In at least one embodiment, the seat bottom is coupled to at least one locking member that is configured to be retained by at least one retainer formed in the floor to secure the deployable seat assembly in the deployed position. The seat bottom may be spring-loaded. The seat bottom may be only moveable into the extended supporting position if the deployable seat assembly is in an initial deployed position.

The deployable seat assembly may include a dampening system, which may include one or both of at least one gas strut assist or at least one spring assist connected between the deployable seat assembly and the ceiling. The deployable seat assembly may include a housing that is modularly securable to the ceiling.

Certain embodiments of the present disclosure provide a method of providing an attendant seat within an interior cabin of a vehicle. The interior cabin includes a floor and a ceiling. The method includes moveably coupling a deployable seat assembly to the ceiling of the interior cabin of the vehicle, securing a portion of the deployable seat assembly in a stowed position within a stowage chamber formed within the ceiling, and moving the deployable seat assembly into a deployed position in which the deployable seat assembly extends between the ceiling and the floor.

DETAILED DESCRIPTION OF THE DISCLOSURE

Figure 1:
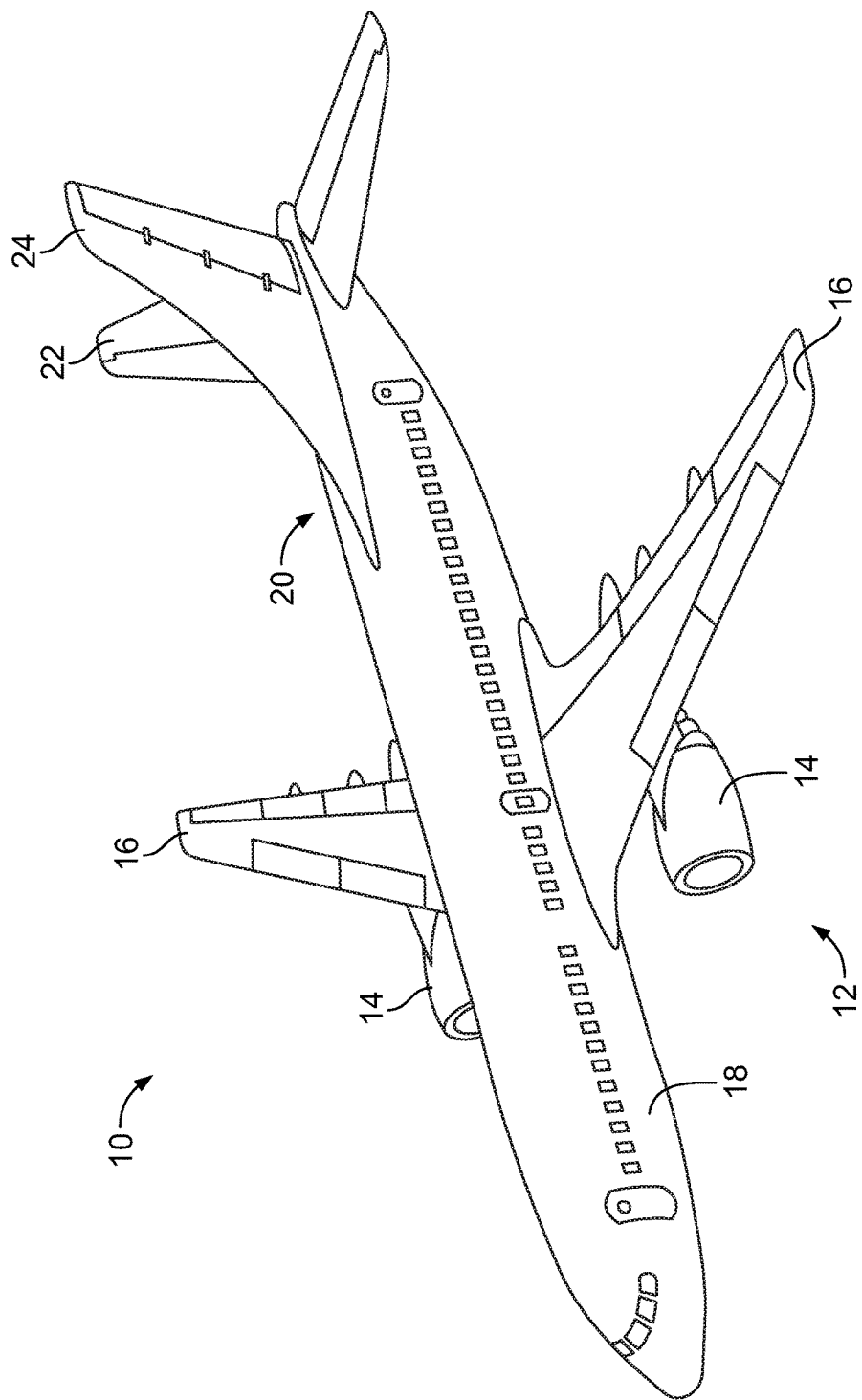
FIG. 1 illustrates a perspective top view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide a deployable seat assembly that is configured to be stowed when not in use. The seat assembly is configured to be stowed within a chamber above or within a ceiling of an interior cabin of a vehicle. For example, the seat assembly may be securely coupled to ceiling structure and/or directly to fuselage structure via a dedicated set of attachments. The ceiling structure may include a strongback that is attached to the fuselage through a system of struts. Stowage bins may be moveably secured to the strongback. Accordingly, a seat assembly that is coupled to a ceiling includes the ceiling being directly connected to ceiling structure (such as a frame, fuselage structure, and/or the like) or indirectly connected to the ceiling structure (such as through one or more structures, such as a strongback, which may be connected to ceiling structure through struts, brackets, and/or the like). When needed by an attendant, for example, (such as during taxi, take-off and landing), the seat assembly is moved into a deployed position, such as being pulled down and locked into a floor of the cabin. In the deployed position, the seat assembly may be disposed outside of an egress path, for example. The deployable seat assembly may be located in an area (such as at the end of an aisle) that allows an attendant seated thereon to view substantially the entire cabin, such that the attendant is able to ensure that passengers are comfortable and safe. At the same time, the deployable seat assembly may be located at an area of the interior cabin that does not extend into an area in which passenger seats may be located.

Embodiments of the present disclosure provide a deployable seat assembly that may be stowed in an unused overhead space, while minimizing or otherwise reducing main cabin footprint impact. The deployable seat assembly may be located out of a main passenger area within an interior cabin, thereby allowing for increased passenger seat count.

In at least one embodiment, the deployable seat assembly may be deployed into a portion of a lavatory, such as located within an aft portion of a vehicle, a galley, a cross-aisle section, and/or the like. For example, the deployable seat assembly may be deployed into a portion of a lavatory of an aircraft during operational phases such as taxi, take-off, and landing, when attendants are seated, and the lavatory is empty.

In at least one embodiment, the deployable seat assembly is located outside of an emergency egress path and attendant assist space. Accordingly, the deployable seat assembly may remain in a deployed position during an emergency event without interfering (for example, extending into) the egress path.

The deployable seat assembly may be configured to allow all attendant seat loads to transfer directly into floor beams and upper crown structure of an interior cabin. In this manner, the deployable seat assembly may not be mounted to a monument, for example. Consequently, the monuments may be lighter, as they need not include structural supports for attendant seats. Also, because the deployable seat assembly may not be secured to a monument, dynamic testing of the monuments may be eliminated, minimized, or otherwise reduced.

In at least one embodiment, the deployable seat assembly may be located proximate to an aisle at an aft area of the interior cabin. As such, the deployable seat assembly provides a seated attendant a direct forward view of the interior cabin. The deployable seat assembly may be modular (for example, being configured to be positioned within reciprocal chambers formed in various vehicles) and configured to be selectively secured into various vehicles.

FIG. 1 illustrates a perspective top view of an aircraft 10 (or aircraft assembly), according to an embodiment of the present disclosure. The aircraft 10 includes a propulsion system 12 that may include two turbofan engines 14, for example. Optionally, the propulsion system 12 may include more or less engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an interior cabin, which may include a cockpit, one or more work sections (for example, galleys, personnel carry-on baggage areas, and the like), one or more passenger sections (for example, first class, business class, and economy class sections), and an aft section in which an aft rest area assembly may be positioned. Each of the sections may be separated by a cabin transition area, which may include one or more monuments, such as galleys, lavatories, closets, partitions, class divider assemblies, and/or the like.

As explained below, the aircraft 10 includes at least one deployable seat assembly, which may be used by a flight attendant. For example, during certain operational phases (such as taxi, takeoff, and landing) of the aircraft 10, the attendant may move the deployable seat assembly into a deployed position. In at least one embodiment, the deployable seat assembly may be located in a portion of a lavatory of the aircraft 10 (such as within or proximate to a threshold of the lavatory) in the deployed position. When not needed (such as when the aircraft 10 is parked at a gate), the attendant moves the deployable seat assembly into a stowed position, such as along a ceiling of the interior cabin.

Alternatively, instead of an aircraft, embodiments of the present disclosure may be used with various other vehicles, such as automobiles, buses, locomotives and train cars, watercraft, spacecraft, and the like.

Figure 2A:
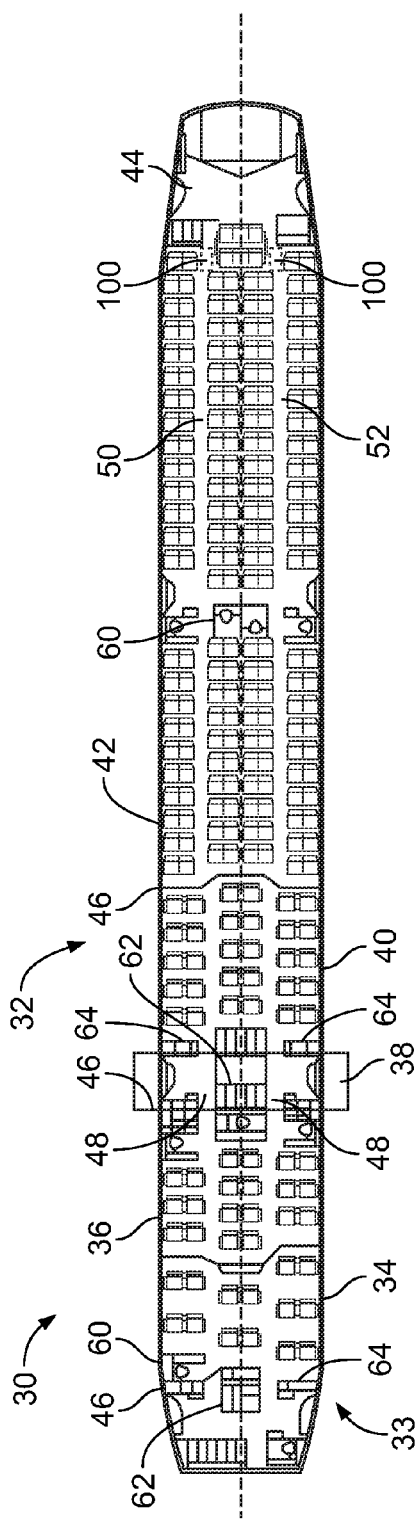
FIG. 2A illustrates a top plan view of an interior cabin of an aircraft, according to an embodiment of the present disclosure.

FIG. 2A illustrates a top plan view of an interior cabin 30 of an aircraft, according to an embodiment of the present disclosure. The interior cabin 30 may be within a fuselage 32 of the aircraft. The interior cabin 30 includes multiple sections, including a front section 33, a first class section 34 (or first class suites, cabins, for example), a business class section 36, a front galley station 38 that includes a monument such as a galley, an expanded economy or coach section 40, a standard economy or coach section 42, and an aft section 44, which may include monuments such as lavatories and galleys. It is to be understood that the interior cabin 30 may include more or less sections than shown. For example, the interior cabin 30 may not include a first class section, and may include more or less galley stations than shown. Each of the sections may be separated by a cabin transition area 46, which may include monuments such as class divider assemblies between aisles 48.

As shown in FIG. 2A, the interior cabin 30 includes two aisles 50 and 52 that lead to the aft section 44. Optionally, the interior cabin 30 may have less or more aisles than shown. For example, the interior cabin 30 may include a single aisle that extends through the center of the interior cabin 30 that leads to the aft section 44.

The interior cabin 30 includes numerous monuments. For example, the interior cabin 30 includes lavatories 60, galleys 62, closets or partitions 64, and the like.

Deployable seat assemblies 100 may be located throughout the interior cabin 30. For example, in stowed positions, deployable seat assemblies 100 may be stowed above the aisles 50 and 52 proximate to or otherwise in the aft section 44.

Figure 2B:
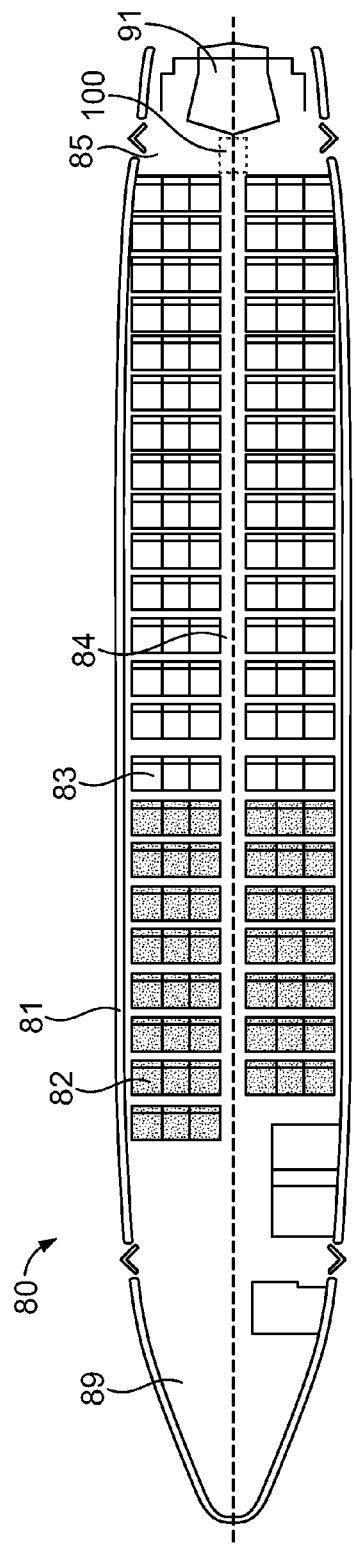
FIG. 2B illustrates a top plan view of an interior cabin of an aircraft, according to an embodiment of the present disclosure.

FIG. 2B illustrates a top plan view of an interior cabin 80 of an aircraft, according to an embodiment of the present disclosure. The interior cabin 80 may be within a fuselage 81 of the aircraft. For example, one or more fuselage walls may define the interior cabin 80. The interior cabin 80 includes multiple sections, including a cockpit 89, a main cabin 82 having passenger seats 83, and an aft section 85 behind the main cabin 82. It is to be understood that the interior cabin 80 may include more or less sections than shown.

The interior cabin 80 may include a single aisle 84 that leads to the aft section 85. The single aisle 84 may extend through the center of the interior cabin 80 that leads to the aft section 85. For example, the single aisle 84 may be coaxially aligned with a central longitudinal plane of the interior cabin 80.

Deployable seat assemblies 100 may be located throughout the interior cabin 80. For example, in a stowed position, a deployable seat assembly 100 may be stowed within a ceiling above the aisle 84 with the aisles 50 and 52 proximate to or within the aft section 85 (and the aft section 44 of FIG. 2A). In at least one embodiment, the deployable seat assembly 100 may be moved into a deployed position such that a portion of the deployable seat assembly 100 is secured within a portion of an aft lavatory 91.

Figure 3:
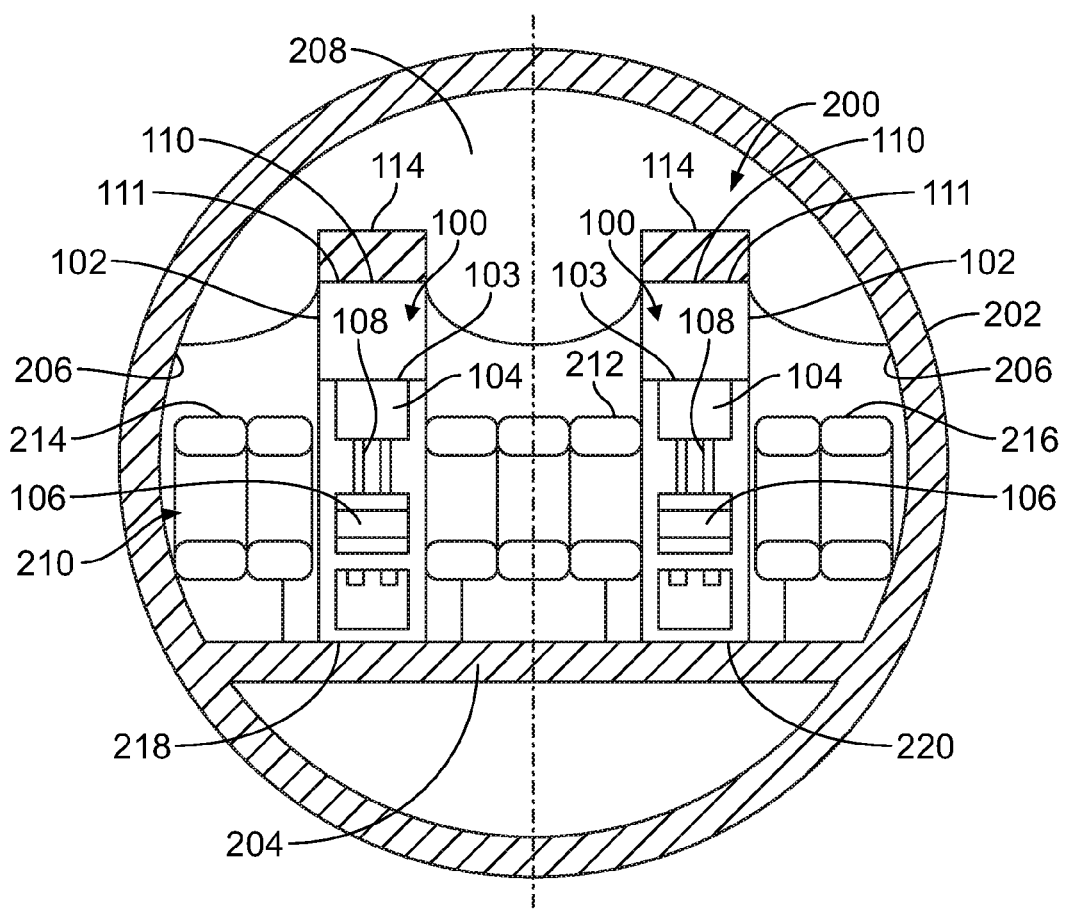
FIG. 3 illustrates an axial internal view of an interior cabin of an aircraft, according to an embodiment of the present disclosure.

FIG. 3 illustrates an axial internal view of an interior cabin 200 of an aircraft 202, according to an embodiment of the present disclosure. The interior cabin 200 includes a floor 204 connected to outer walls 206 and a ceiling 208. The floor 204 supports rows of passenger seats 210. For example, the passenger seats 210 are secured to seat tracks (not shown in FIG. 3) on or within the floor 204 through seat fittings (not shown in FIG. 3). Each row of passenger seats 210 may include an inboard section 212 spaced from two outboard sections 214 and 216 by aisles 218 and 220, respectively. Optionally, the rows of passenger seats 210 may include more or less seats than shown. Also, the interior cabin 200 may include more or less aisles than shown.

Deployable seat assemblies 100 are moveably secured to the ceiling 208 above the aisles 218 and 220. Each deployable seat assembly 100 may include a carrier frame 102 that supports a seat 103 having a backrest 104, and a seat bottom 106. A seat belt 108 may be coupled to one or both of the backrest 104 and/or the seat bottom 106.

The carrier frame 102 is pivotally or otherwise moveably coupled to the ceiling 208 through a pivot axle 110, such as one or more axles, rod(s), bar(s), beam(s), mechanism(s) and/or the like. The pivot axle 110 may be part of the carrier frame 102, and may extend into reciprocal openings within the ceiling 208, through which the pivot axle 110 is rotatable. Optionally, the pivot axle 110 extends within the ceiling 208, and the carrier frame 102 may include one or more attachments (such as bushings, bearings, lugs, devises, eyelets, and/or the like) that rotatably secure around the pivot axle 110. The pivot axle 110 may have a longitudinal axis 111 that is perpendicular to a longitudinal axis of the interior cabin 200. For example, the pivot axle 110 may span across a width of an aisle.

As shown in FIG. 3, the deployable seat assemblies 100 are in deployed positions, in which the seat assemblies 100 are moved into the aisles 218 and 220. In order to stow the seat assemblies 100, each carrier frame 102 is upwardly pivoted (for example, swung) about the longitudinal axis 111. During such motion, the seat assemblies 100 are moved out of the aisles and into stowage chambers 114 formed within the ceiling 208. Each deployable seat assembly 100 is moved out of the aisle 218 or 220 and into a respective stowage chamber 114 such that an exposed surface (for example, a bottom surface) of the carrier frame 102 provides a lower portion of the ceiling 208. In the stowed position, the carrier frame 102 may cover or otherwise hide the seat 103, which is stowed within the stowage chamber 114. The carrier frame 102 may include a latch that is configured to latchably engage a reciprocal structure of the ceiling 208 in order to securely lock the deployable seat assembly 100 in a locked position. An individual may engage the latch to unlock and move the deployable seat assembly 100 into the deployed position (as shown in FIG. 3).

Figure 4:
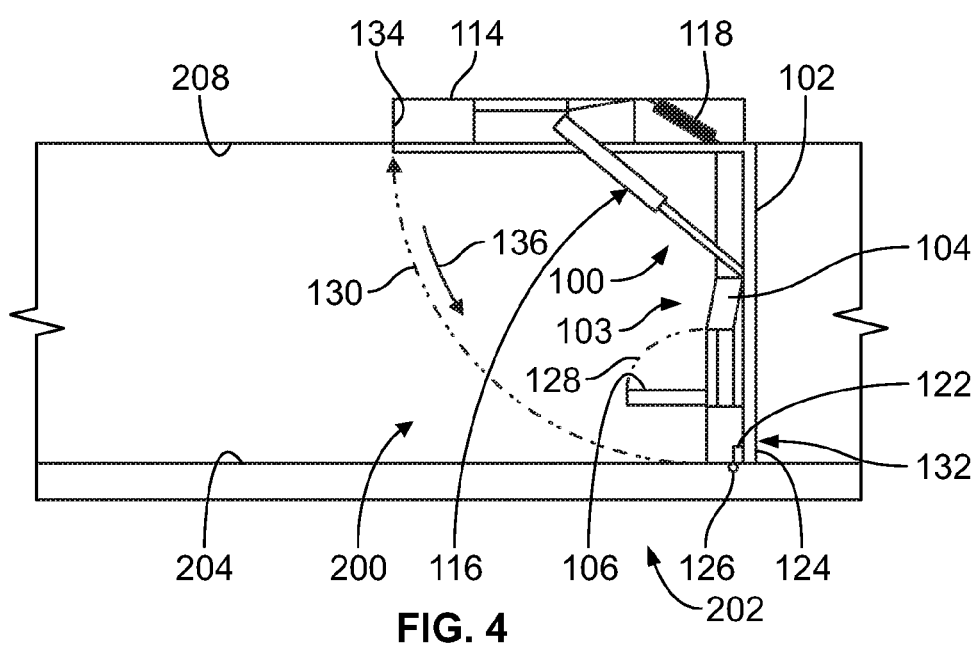
FIG. 4 illustrates a lateral view of a deployable seat assembly in a deployed position within an interior cabin of an aircraft, according to an embodiment of the present disclosure.

FIG. 4 illustrates a lateral view of the deployable seat assembly 100 in the deployed position within the interior cabin 200 of the aircraft 202, according to an embodiment of the present disclosure. As shown, lateral struts 116 may couple lateral portions of the carrier frame 104 to the ceiling 208. The lateral struts 116 may be or include gas strut assists that are configured to assist and control motion of the deployable seat assembly 100 between deployed and stowed states. Additionally, spring assists 118 (such as coil spring assists) may also couple the carrier frame 104 to the ceiling 208. The spring assists 118 may also be configured to assist and control motion of the deployable seat assembly 100 between the deployed and stowed states. Optionally, the deployable seat assembly 100 may not include the lateral struts 116 or the spring assists 118.

One or more locking members 122 may outwardly extend from a distal end 124 of the carrier frame 102. The locking members 122 may be pins, barbs, latches, clasps, or other such protuberances that are configured to be retained within reciprocal retainers 126 (such as divots, cavities, holes, or other such openings) formed within the floor 204. As the deployable seat assembly 100 is moved into the deployed state, the locking members 122 are received and retained within the retainers 126, thereby securing the deployable seat assembly 100 in the deployed position.

As shown, the seat bottom 106 may be configured to rotate into an extended supporting position. An individual (such as a flight attendant) may pivot the seat bottom 106 into an upright stowed position in the direction of arc 128. For example, the seat bottom 106 may be pivoted into a stowed, upright position so as not to extend into an egress path.

In order to move the deployable seat assembly 100 into the stowed position, an individual (such as a flight attendant) may pull or otherwise move the distal end 124 of the carrier frame upwardly in the direction of arc 130. As the individual pulls the distal end 124, the locking members 122 disengage from the retainers 126. For example, the locking members 122 may be spring-biased into the retainers 126. With sufficient force exerted by an individual in the direction of arc 130, the spring force is overcome, thereby removing the locking members 122 from the retainer 126. Optionally, the locking members 122 may be operatively coupled to an actuator, such as a button, cord, handle, and/or the like that upwardly retracts the locking members 122 when engaged.

In the stowed position, a latch 132 of the carrier frame 102 may engage a reciprocal lock 134 on or within the ceiling 208 to securely lock the deployable seat assembly 100 in the stowed position. In order to move the deployable seat assembly 100 into the deployed position, an individual may engage and unlock the latch 132 from the lock 134, then pull the deployable seat assembly 100 down in the direction of arc 136.

Figure 5:
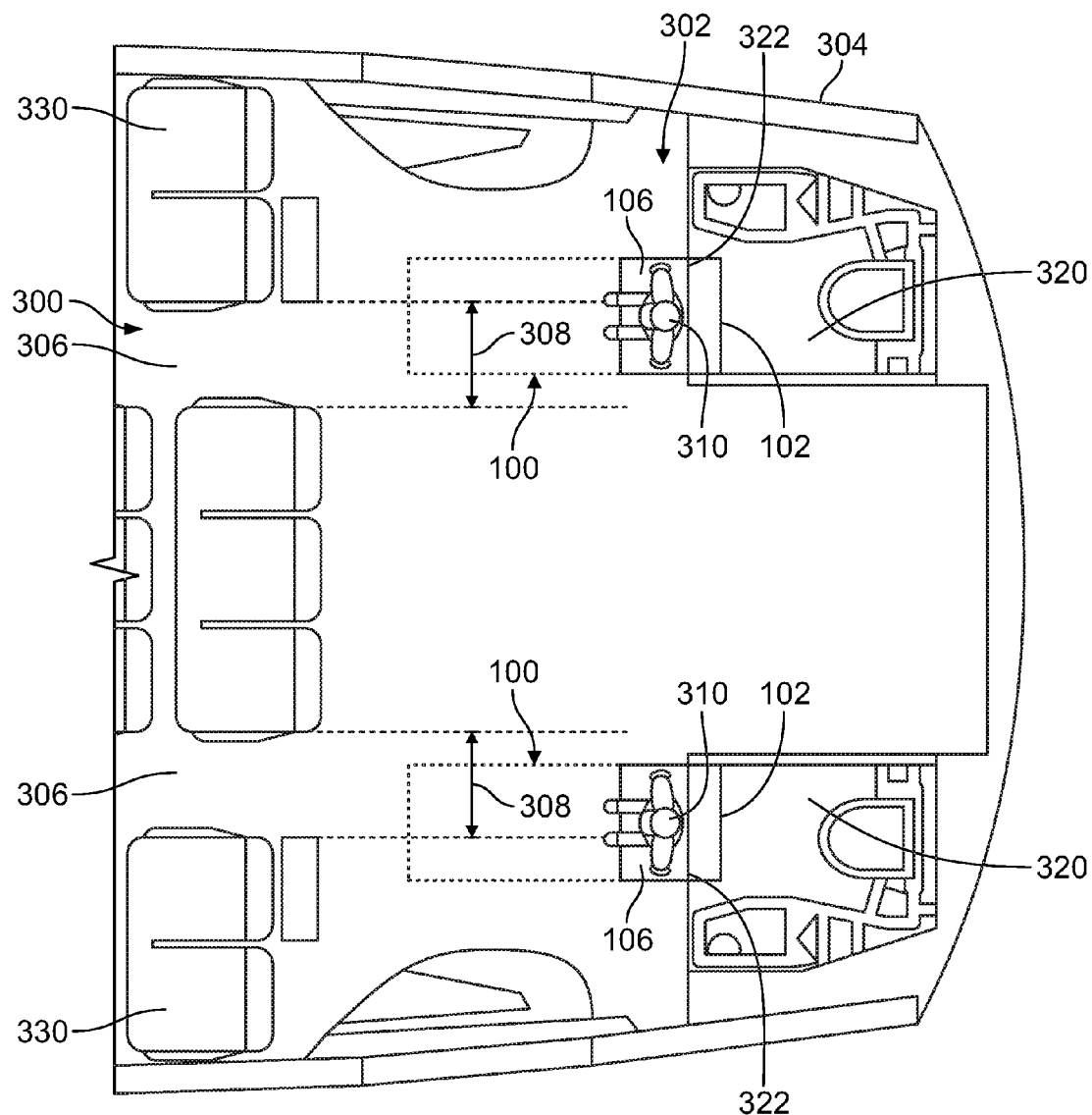
FIG. 5 illustrates a top plan view of an aft portion of an interior cabin of an aircraft, according to an embodiment of the present disclosure.

FIG. 5 illustrates a top plan view of an aft portion 300 of an interior cabin 302 of an aircraft 304, according to an embodiment of the present disclosure. As shown, deployable seat assemblies 100 may be located in the aft portion 300. The deployable seat assemblies 100 may be moved into the deployed positions during certain operation phases (such as taxi, takeoff, and landing) of the aircraft 304. In the deployed position, each deployable seat assembly 100 may be aligned with a respective aisle 306. For example, in the deployed position, a seat bottom 106 may be positioned within at least a portion of an axial envelope 308 of an aisle 306. In this manner, an attendant 310 seated on the seat bottom 106 has a forward-looking view of the interior cabin 302 down the aisle 306.

In the deployed position, the carrier frame 102 of the deployable seat assembly 100 may extend into a portion of a lavatory 320. For example, the carrier frame 102 may extend into a threshold 322 of the lavatory 320 defined by a door frame of the lavatory 320. During certain operational phases (such as taxi, takeoff, and landing) of the aircraft, the lavatory 320 is unoccupied. As such, the deployable seat assemblies 100 may be located to utilize the unused space of the lavatories 320 during such times, and not extend into other areas of the interior cabin 302 that may be used for passenger seats 330. Alternatively, the deployable seat assemblies 100 may be located at various other areas of the interior cabin 302 that may or may not be proximate to the lavatories 320.

Figure 6:
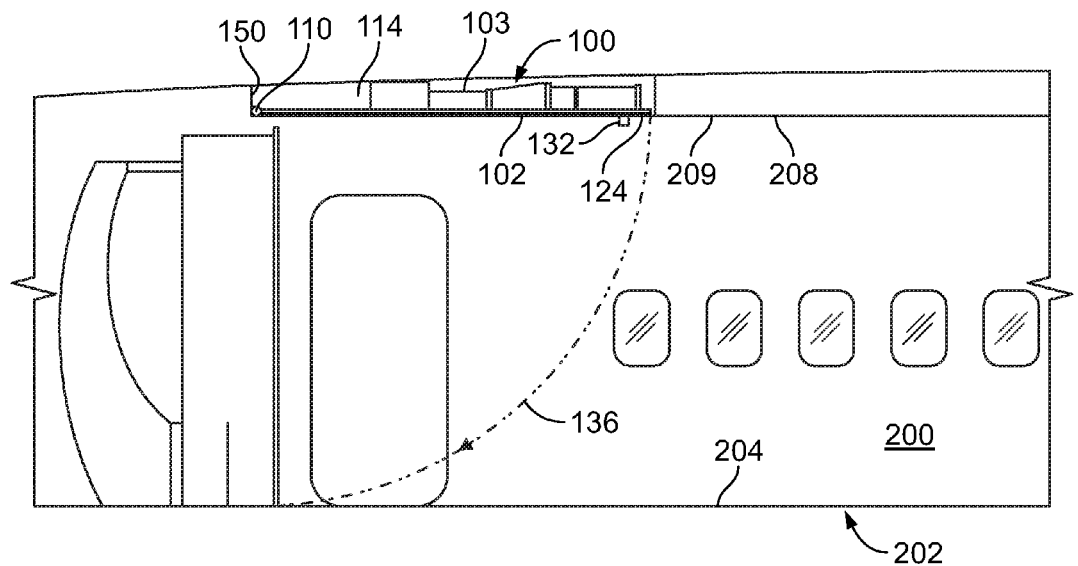
FIG. 6 illustrates a lateral view of a deployable seat assembly in a stowed position within an interior cabin of an aircraft, according to an embodiment of the present disclosure.

FIG. 6 illustrates a lateral view of the deployable seat assembly 100 in a stowed position within the interior cabin 200 of the aircraft 202, according to an embodiment of the present disclosure. In the stowed position, the exposed lower surface of the carrier frame 102 may be flush or substantially flush with the lower surface 209 of the ceiling 208, thereby providing a ceiling portion. The seat 103 is stowed and hidden within the stowage chamber 114 formed in the ceiling 208.

In at least one embodiment, the deployable seat assembly 100 may include a housing 150 that defines the stowage chamber 114. The housing 150 may include an outer frame(s), bracket(s), wall(s), and/or the like. The housing 150 pivotally couples to the carrier frame 102 and/or the seat 103, such as through one or more axles, rods, and/or the like. In this manner, the housing 150 may provide a modular housing that may be selectively inserted and removed from chambers formed within ceilings of vehicles.

In order to move the deployable seat assembly 100 into the deployed position, an individual (such as a flight attendant) engages and unlocks the latch 132. After the latch 132 is unlocked, the individual pulls the distal end 124 of the carrier frame 102 (such as via the latch 132) downwardly and rearwardly so that the deployable seat assembly 100 swings downwardly and rearwardly about the pivot axle 110 in the direction of arc 136.

Figure 7:
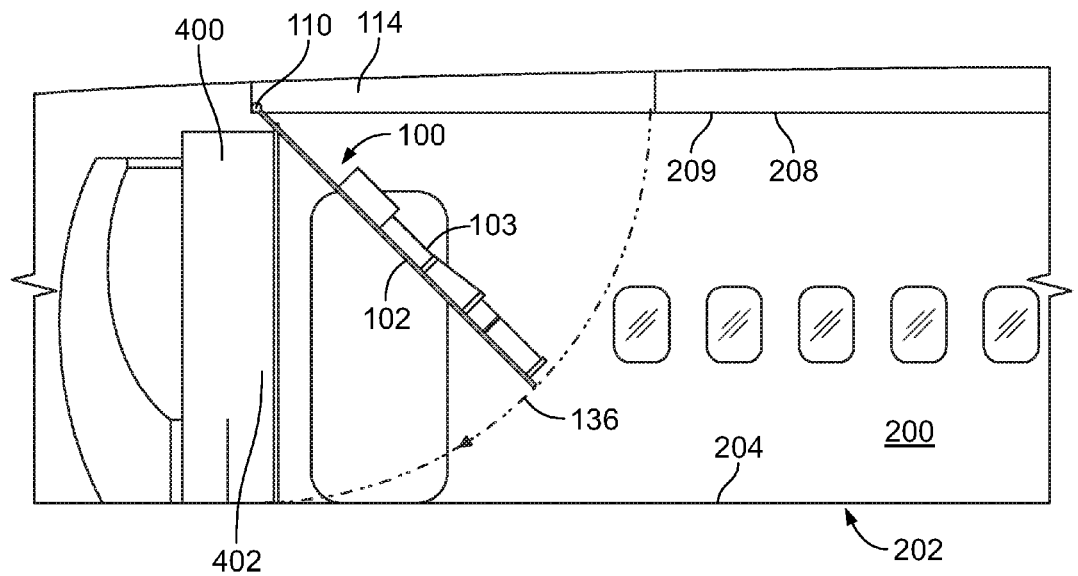
FIG. 7 illustrates a lateral view of a deployable seat assembly in an intermediate position within an interior cabin of an aircraft, according to an embodiment of the present disclosure.

FIG. 7 illustrates a lateral view of the deployable seat assembly 100 in an intermediate position within the interior cabin 200 of the aircraft 202, according to an embodiment of the present disclosure. The deployable seat assembly 100 is swung towards a deployed state about the pivot axle 110 in the direction of arc 136 towards a lavatory 400. As shown, the pivot axle 110 may be located over a threshold 402 of the lavatory 400.

Figure 8:
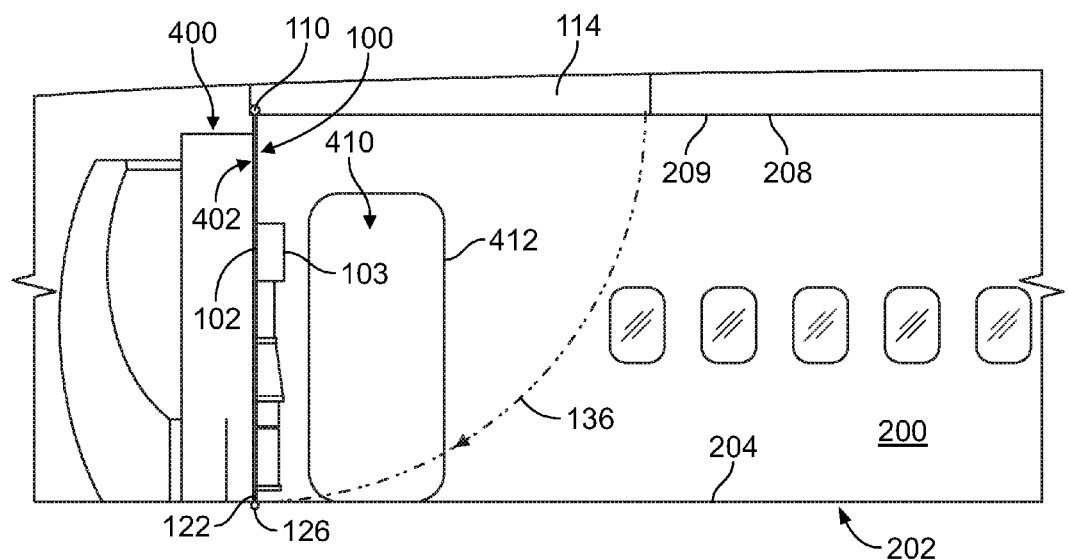
FIG. 8 illustrates a lateral view of a deployable seat assembly in an initial deployed position within an interior cabin of an aircraft, according to an embodiment of the present disclosure.

FIG. 8 illustrates a lateral view of the deployable seat assembly 100 in an initial deployed position within the interior cabin 200 of the aircraft 202, according to an embodiment of the present disclosure. In the deployed position, including the initial deployed position, the carrier frame 102 may extend into the threshold 402 of the lavatory 400, thereby taking advantage of unused space within the interior cabin 200 during certain operational phased (such as taxi, takeoff, and landing). In the initial deployed position, one more locking members 122 of the deployable seat assembly 100 may be securely retained within one or more reciprocal retainers 126 formed in the floor 204.

As shown, in the initial deployed position, the seat bottom (hidden from view in FIG. 8) is in an upright stowed position. As such, in the initial stowed position, no portion of the deployable seat assembly 100 extends into an egress path 410 that leads to an exit 412 of the aircraft 202.

Figure 9:
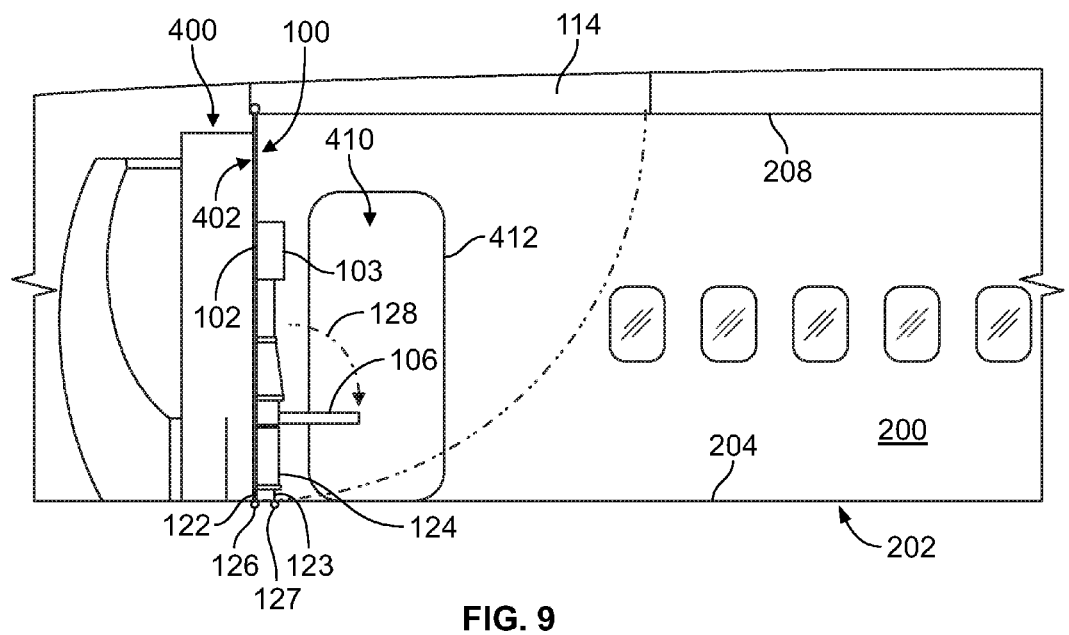
FIG. 9 illustrates a lateral view of a deployable seat assembly in a fully deployed position within an interior cabin of an aircraft, according to an embodiment of the present disclosure.

FIG. 9 illustrates a lateral view of the deployable seat assembly 100 in a fully deployed position within the interior cabin 200 of the aircraft 202, according to an embodiment of the present disclosure. In order to fully deploy the deployable seat assembly 100, an individual (such as a flight attendant) swings the seat bottom 106 from a seat stowed position outwardly in the direction of arc 128. The seat bottom 106 may be coupled to one or more secondary locking members 123. As the seat bottom 106 is fully extended into a supporting position (as shown in FIG. 9) the secondary locking member(s) 123 may extend downwardly therefrom (such as through a spring-biased coupling), outwardly from the distal end 124 of the carrier frame 102, and into reciprocal secondary retainer(s) 127 formed through in floor 204. As the secondary locking member(s) 123 fully engage the retainer(s) 127, an audible indication (such as a click) may be emitted, thereby providing the individual with direct positive feedback indicating that the deployable seat assembly 100 is in the fully deployed position. Alternatively, the deployable seat assembly 100 may not include the secondary locking members 123.

In at least one embodiment, the seat bottom 106 is operatively coupled to the locking members 122. The seat bottom 106 may be prevented from swinging open into an extended supported position until the locking members 122 are retained within the retainers 126. For example, a portion of the seat bottom 106 may be coupled to the locking members 122 through one or more springs that exert a retracting or pulling force into the seat bottom 106. The springs may also be coupled to the locking members 122. After the locking members 122 extend into the retainers 126, the retracting force is released, and the seat bottom 106 may then be swung into the extended supporting position.

Referring to FIGS. 8 and 9, in the deployed position (including the initial deployed position and the fully deployed position), at least a portion of the deployable seat assembly 100 (such as the carrier frame 102) may be positioned within a portion of the lavatory 400 (such as within the threshold 402). The carrier frame 102 may be sized and shaped to fit within the threshold 402 so that interior portions of the lavatory 400 are blocked from view by the deployable seat assembly 100 in the deployed position. Further, because the deployable seat assembly 100 extends into the threshold 402 in the deployed position, a door of the lavatory 400 may be prevented from being closed (such as by being blocked by the carrier frame 102).

Upon being moved into the deployed position, the deployable seat assembly 100 may remain deployed without interfering with the egress path 410. For example, an individual may simply rotate the seat bottom 106 upwardly into a stowed position with respect to the seat 103 so that no portion of the deployable seat assembly 100 extends into the egress path 410. Optionally, the seat bottom 106 may be spring-loaded to upwardly close when an individual moves off the seat bottom 106.

Notably, the deployable seat assembly 100 is moveably connected to the ceiling 208 and is configured to securely couple to the floor 204 in the deployed position. The weight of the deployable seat assembly 100 is supported by the ceiling 208 (such as the upper crown support structure) and/or the floor 204 (such as floor beams). In this manner, the deployable seat assembly 100 need not be supported by any monuments within the interior cabin 200.

As shown and described, the aircraft 202 includes the interior cabin 200 that includes the floor 204 and the ceiling 208. The deployable seat assembly 100 is moveably coupled to the ceiling 208, and is moveable between the stowed position in which the deployable seat assembly 100 is stowed within a portion of the ceiling 208 (such as within the stowage chamber 114), and the deployed position in which the deployable seat assembly 100 extends between the ceiling 208 and the floor 204.

Figure 10:
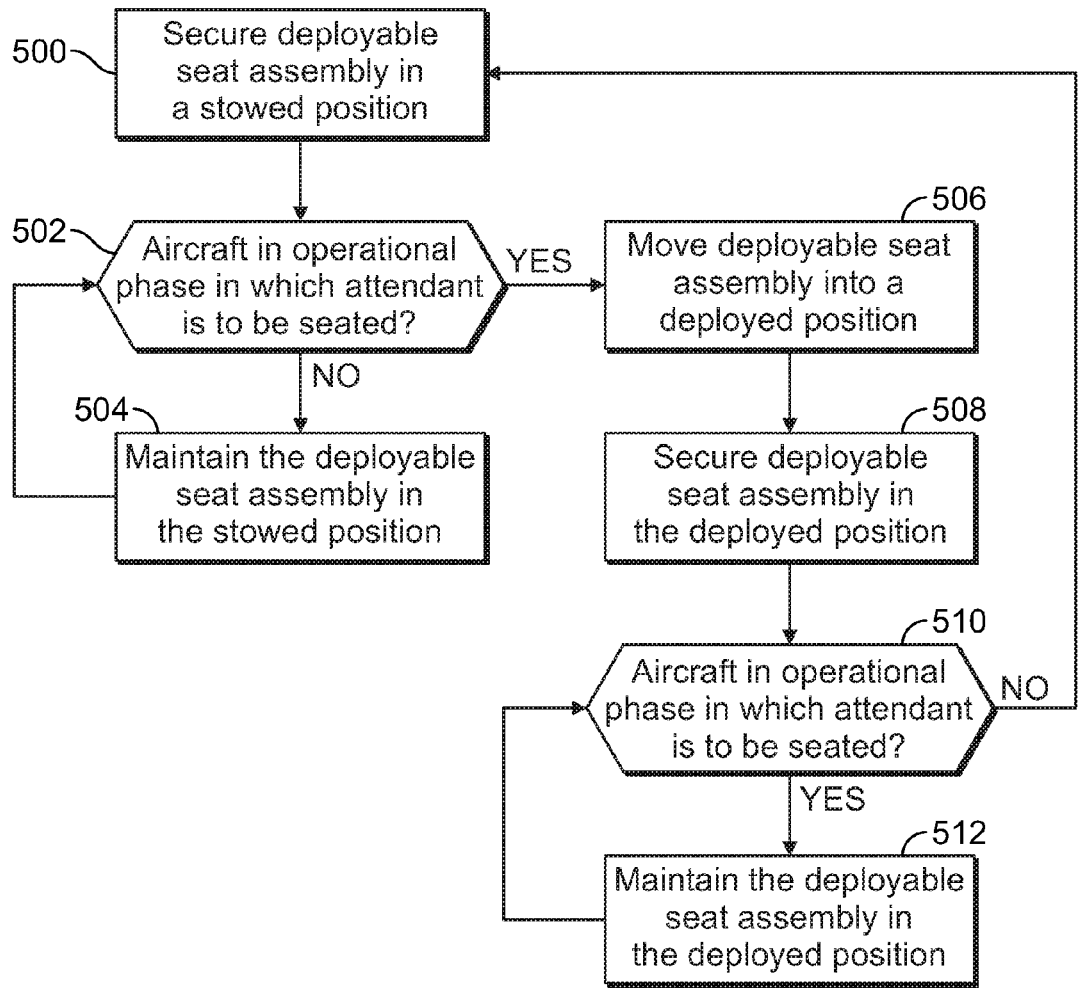
FIG. 10 illustrates a flow chart of a method of operating a deployable seat assembly within an aircraft, according to an embodiment of the present disclosure.

FIG. 10 illustrates a flow chart of a method of operating a deployable seat assembly within an aircraft, according to an embodiment of the present disclosure. At 500, the deployable seat assembly is secured in a stowed position. For example, the deployable seat assembly is secured within a stowage bin within a ceiling of an interior cabin of the aircraft. The stowage bin may be above a portion of an aisle within the interior cabin of the aircraft. In at least one embodiment, at least a portion of the stowage bin may be above a threshold of a lavatory within the interior cabin of the aircraft.

At 502, it is determined if the aircraft is in an operational phase in which an attendant is to be seated. During such an operational phase, the deployable seat assembly is to be deployed so that an attendant may be seated. The operational phase may be a taxi phase, a takeoff phase, or a landing phase. If the aircraft is not in such an operational phase, the method proceeds from 502 to 504, in which the deployable seat assembly is maintained in the stowed position. The method then returns to 502.

If, however, the aircraft is in an operational phase in which an attendant is to be seated, the method proceeds from 502 to 506, in which the deployable seat assembly is moved into a deployed position. Next, at 508, the deployable seat assembly is secured in the deployed position. For example, one or more locking members of the deployable seat assembly may be received and retained by one or more retainers formed in the floor of the interior cabin.

At 510, it is again determined if the aircraft is an in operational phase in which an attendant is to be seated. If the aircraft is in such an operational phase, the method proceeds from 510 to 512, in which the deployable seat assembly is maintained in the deployed position. The method then returns to 510. If, however, the aircraft is not in an operational phase in which an attendant is to be seated, the method returns to 500 from 510.

Referring to FIGS. 1-10, embodiments of the present disclosure include systems and methods of providing attendant seats within an aircraft that allow for increased passenger seating capacity. Embodiments of the present disclosure provide attendant seat assemblies that allow for increased passenger seating capacity within an interior cabin of a vehicle, such as an aircraft. Embodiments of the present disclosure provide attendant seat assemblies that may be efficiently located within an interior cabin of an aircraft. Embodiments of the present disclosure provide attendant seat assemblies that need not be secured to a monument within an interior cabin of a vehicle.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft vehicle comprising:
    an interior cabin including a floor and a ceiling; and
    a deployable seat assembly moveably coupled to the ceiling, wherein the deployable seat assembly is moveable between a stowed position in which at least a portion of the deployable seat assembly is stowed within a stowage space within the ceiling and an exposed lower surface of a carrier frame of the deployable seat assembly is substantially flush with a lower surface of the ceiling, and a deployed position in which the deployable seat assembly extends between the ceiling and the floor.

2. The aircraft of claim 1, wherein the interior cabin comprises an aisle extending between sections of passenger seats, wherein the deployable seat assembly is stowed above a portion of the aisle in the stowed position, and wherein the deployable seat assembly connects to a floor portion of the aisle in the deployed position.

3. The aircraft of claim 1, wherein the interior cabin further comprises a lavatory, and wherein the deployable seat assembly extends into an entry into the lavatory in the deployed position.

4. The aircraft of claim 3, wherein the portion of the lavatory comprises a threshold of the lavatory.

5. The aircraft of claim 1, wherein the deployable seat assembly comprises a carrier frame that supports a seat having a backrest and a seat bottom.

6. The aircraft of claim 5, wherein the carrier frame provides a ceiling portion when the deployable seat assembly is in the stowed position.

7. The aircraft of claim 5, wherein the seat bottom is moveable between a seat stowed position and an extended supporting position.

8. The aircraft of claim 7, wherein the seat bottom is coupled to at least one locking member, wherein at least one retainer formed in the floor is configured to retain the at least one locking member to secure the deployable seat assembly in the deployed position.

9. The aircraft of claim 7, wherein the seat bottom is only moveable into the extended supporting position when the deployable seat assembly is in an initial deployed position.

10. The aircraft of claim 1, wherein the deployable seat assembly comprises one or both of at least one gas strut assist or at least one spring assist connected between the deployable seat assembly and the ceiling.

11. The aircraft of claim 1, wherein the deployable seat assembly comprises a housing that is modularly securable to the ceiling.

12. A method of providing an attendant seat within an interior cabin of an aircraft, wherein the interior cabin includes a floor and a ceiling, the method comprising:
    moveably coupling a deployable seat assembly to the ceiling of the interior cabin of the vehicle;
    securing a portion of the deployable seat assembly in a stowed position within a stowage chamber formed within the ceiling, wherein an exposed lower surface of a carrier frame of the deployable seat assembly is substantially flush with a lower surface of the ceiling in the stowed position; and
    moving the deployable seat assembly into a deployed position in which the deployable seat assembly extends between the ceiling and the floor.

13. The method of providing an attendant seat within an interior cabin of an aircraft of claim 12, wherein the securing comprises stowing the portion of the deployable seat assembly above a portion of an aisle of the interior cabin, and wherein the moving comprises connecting the deployable seat assembly to a floor portion of the aisle in the deployed position.

14. The method of providing an attendant seat within an interior cabin of an aircraft of claim 12, wherein the securing comprises securing the portion of the deployable seat assembly over a portion of a lavatory of the interior cabin in the stowed position, and wherein the moving comprises extending the deployable seat assembly into the lavatory in the deployed position.

15. The method of providing an attendant seat within an interior cabin of an aircraft of claim 12, further comprising supporting a seat of the deployable seat assembly with a carrier frame.

16. The method of providing an attendant seat within an interior cabin of an aircraft of claim 15, wherein the securing comprises providing a ceiling portion with the carrier frame when the deployable seat assembly is in the stowed position.

17. The method of providing an attendant seat within an interior cabin of an aircraft of claim 15, wherein a seat bottom of the seat is moveable between a seat stowed position and an extended supporting position.

18. The method of providing an attendant seat within an interior cabin of an aircraft of claim 17, further comprising coupling the seat bottom to at least one locking member that is securable within at least one retainer formed in the floor to secure the deployable seat assembly in the deployed position.

19. The method of providing an attendant seat within an interior cabin of an aircraft of claim 17, further comprising preventing the seat bottom from moving into the extended supporting position until the deployable seat assembly is secured in an initial deployed position.

20. The method of providing an attendant seat within an interior cabin of an aircraft of claim 12, wherein the deployable seat assembly comprises a housing that modularly secures to the ceiling.

* * * * *